United States Patent [19]

Shen

[11] Patent Number: 4,696,684
[45] Date of Patent: Sep. 29, 1987

[54] METHOD AND APPARATUS FOR ELIMINATING CAVITATION IN HYDRAULIC SYSTEMS

[76] Inventor: Hanshi Shen, Room 403, 93, 11 Cun, Shanghai Petroleum and Chemical Factory, Jinshan, Shanghai, China

[21] Appl. No.: 873,810

[22] Filed: Jun. 13, 1986

[30] Foreign Application Priority Data

Jun. 13, 1985 [CN] China .................. 85104763

[51] Int. Cl.$^4$ .................... B01D 19/00
[52] U.S. Cl. .................... 55/89; 55/189
[58] Field of Search .................... 55/55, 189

[56] References Cited

U.S. PATENT DOCUMENTS

| 4,052,852 | 10/1977 | Hart ........................ 60/478 |
| 4,322,226 | 3/1982 | Hudec ...................... 55/55 X |
| 4,385,909 | 5/1983 | Starr ........................ 55/55 |
| 4,561,866 | 12/1985 | Altmann et al. .......... 55/189 X |
| 4,602,923 | 7/1986 | Bernstein .................. 55/55 X |

Primary Examiner—Charles Hart
Attorney, Agent, or Firm—Balogh, Osann, Kramer, Dvorak, Genova & Traub

[57] ABSTRACT

This invention relates to the method and apparatus for eliminating cavitation in the hydraulic system. In the hydraulic fluid there is great difference between the seperating pressure of the air, water content and volatile substance from said fluid and the saturated vapor pressure of said fluid. With the heating method and vacuumizing technique, the air, water content and volatile substance in said hydraulic fluid which are sealed in a tank may be seperated and exhausted. With the changing of volume changeable device, the working fluid is pressurized up to the operating pressure. The apparatus designed according to this invention may be used either a movable pre-treatment device to replace the working fluid in the hydraulic system or an independent hydraulic pump station.

12 Claims, 1 Drawing Figure

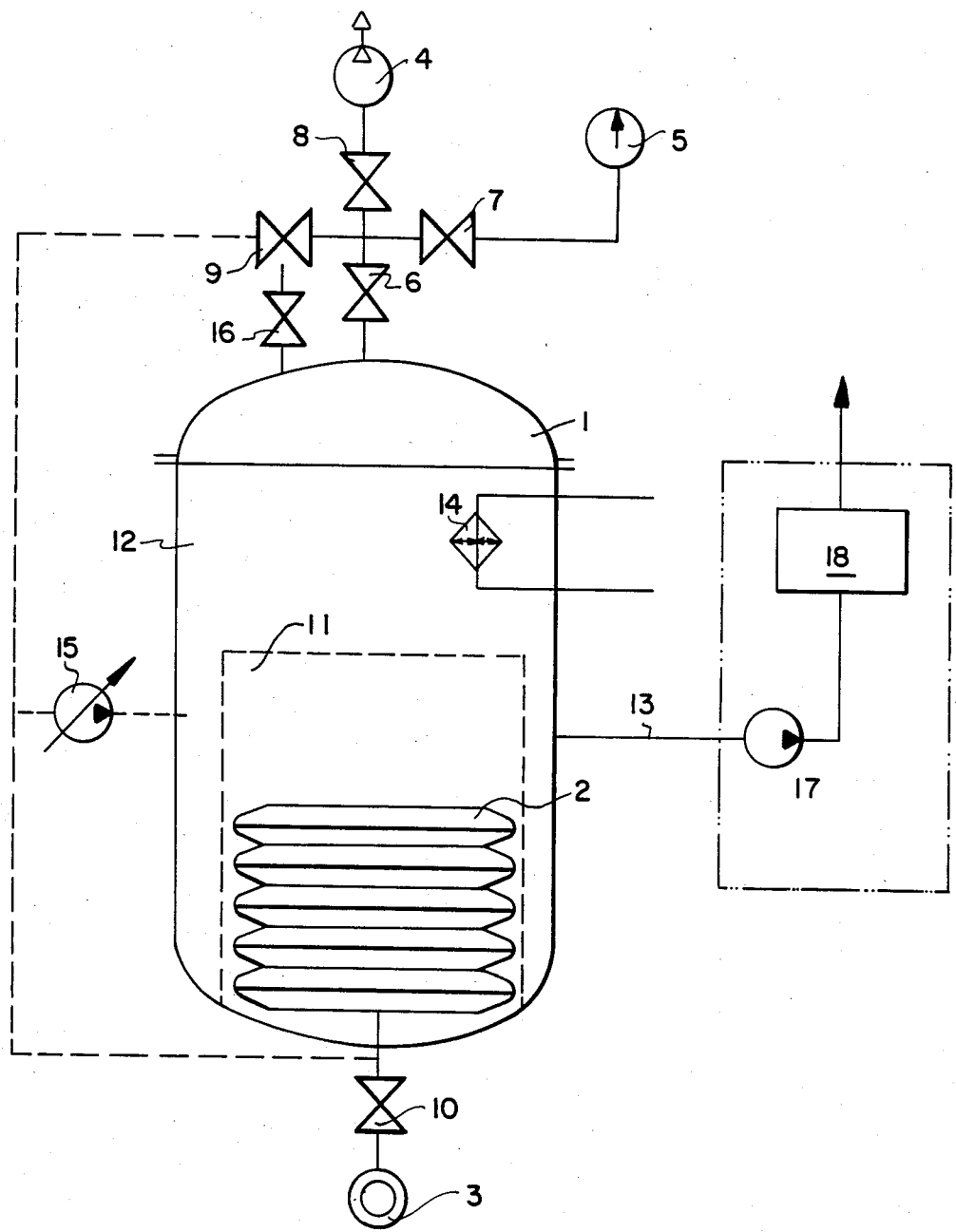

METHOD AND APPARATUS FOR ELIMINATING CAVITATION IN HYDRAULIC SYSTEMS

Present invention relates to a method and apparatus for eliminating cavitation in hydraulic systems.

In a hydraulic system there are many places where flow speed and pressure change. Cavitation occurs when pressure at certain place drops to the gas separating pressure of oil fluid.

After a cavity has appeared, it follows the oil flow to an area of higher pressure where it breaks, resulting in a local high pressure and high temperature. The high temperature tends to decrease density and viscosity of oil fluid, causes oil fluid to be oxidized, acidified and gradually deteriorated, thus reduces service life of oil fluid; at the same time, it brings about physical-chemical spot corrosion of hydraulic components. Moreover, high pressure drips constantly strike the surface of components, causing spot corrosion of fatigue nature. Overall, these two kinds of spot corrosion are known as cavity corrosion.

A prolonged effect as such will damage the hydraulic components.

Cavitation results in other severe problems as well: it causes vibration and noise in hydraulic systems, harms system stability, decreases the stiffness of cylinder, reduces the precision of actuator movement and volumetric efficiency of pump, forms cavity blockade at flow controlling points and deteriorates dynamic characteristics of the system.

Therefore, a great attention has been paid to the phenomenon of cavitation by people in areas of hydraulic research, hydraulic industry and hydraulic application. However, no satisfactory solution to the cavitation problem has been obtained up to now.

Prior to present invention, Japanese Patent Office published a hydraulic apparatus (JP-A-58-119305) which eliminates gas in the running process of a hydraulic pump and system, that is, eliminates gas dynamicly. However, in order to achieve effective elimination of gas dissolved n oil fluid, it is necessary to have a very low pressure in tank, which severely deteriorates the working condition of a pump so that the pump even cannot normally operate. On the other hand, in order to keep pump in normal operation, it is necessary to increase the pressure in tank, then it is difficulty to eliminate gas from oil fluid effectively. For this reason, it still have some problems to put said apparatus into practical use.

Additionally, in Hart's patent (U.S. Pat. No. 4,052,852) granted by Patent and Trademark Office of U.S.A., a rubber bladder was used in a sealed tank. However, according to said invention, the bladder is filled with compressed air so that it expands, which results in an increased pressure in said tank, which in turn improves sucking capability of pump, and it is not related to eliminating cavitation in hydraulic systems.

In Starr's patent (U.S. Pat. No. 4,385,909), an inflatable bladder is used to increase pressure inside a sealed tank, but the highest pressure thereof is only an atmospheric pressure limited by the structure itself. A flexible diaphragm is adapted in the upper portion of a sealed tank, so the vacuum of the interior sealed tank cannot reach any higher. Such arrangement can only remove partly gaseous impurities from the hydraulic fluid, but not eliminate cavitation thereof.

A method and an apparatus for degassing a fluid is mentioned in Hudec's patent (U.S. Pat. No. 4,322,226). A flexible bag is used inside a sealed tank. The function of the bag is to expand and compensate for vacuum in a receptacle interior during fluid removal. The pressure inside the flexible bag cannot be higher than an atmospheric pressure when the bag expands. No provision is made for eliminating cavitation in the hydraulic fluid.

The purpose of present invention is to provide an active method which can eliminate cavitation more thoroughly and an apparatus with practical value.

The essence of present invention lies in a pretreatment method of hydraulic oil, which, taking advantage of a distinguishing feature that the separating pressure of gas, water content and volatile substances mixed as well as dissolved in oil fluid is greatly different from saturation vapour pressure of oil fluid, so fast separates air, water and volatile substances from oil fluid by method of changing volume and vacuum technique. Since air, water and volatile substances have been removed, no cavitation may occur. Due to the static treatment method applied by present invention, not only it can ensure more complete removal of air, water and volatile substances from hydraulic oil, but also it can ensure various working pressures at pump inlet. Therefore, it has a great practical value. According to this method, present invention provides an appropriately designed apparatus for static pretreatment of hydraulic oil. Said apparatus mainly consists of a sealed container, a degassing device, a volume changeable device, a temperature controller and hydraulic pipelines for inlet and outlet.

A further description of preferred embodiment of present invention is given in detail with an appended drawing as follows.

FIG. 1 is a schematic drawing showing structural principle of said apparatus, wherein the sealed container is a sealed tank (1), on top of which there is a pipe line connected to vacuum cut-off valve (6), valve (6) is connected with a four-way connector, the other three passages of which are connected respectively with vacuum cut-off valves (7), (8), (9). Valve (7) is connected with vacuum pressure gauge (5). Valve (8) is connected with vacuum pump (4). Valve (9) is connected with a three-way connector through a controlling pipe line (as a dotted line shown in the drawing). The second passage of said three-way connector is connected with cut-off valve (10), which is connected with air source (3). The remaining passage of said three way connector is connected with bladder (2). Outside the bladder there is a expansion restrictive casing (11). In the drawing, numeral reference (1) means the sealed container, i.e. sealed tank; vacuum pump (4), vacuum pressure gauge (5), vacuum cut-off valves (6), (7), (8) and (9) constitute degassing device; bladder (2), air source (3), cut-off valves (9), (10) and expansion restrictive casing (11) constitute volume changeable device; (14) is the temperature controller.

The upper-inner wall of the sealed container, i.e. the sealed tank (1), has a convex shape or other shapes inclined topwards so that gas can be collected at the top and exhausted. the requirements to the bladder are as follows: not only it is required to be able to expand, but also it is required to be able to contract; its size should meet the demand of flow variation from system actuator; its material should be highly elastic and oil resistant; it should have a good sealing, no gas is permitted to enter into the oil from the bladder; it may take a shape of bag, multi-folded bag or bellows. It can be a rubber bladder, as well as a rubber film, metal film, metal bellow, cylinder or accumulator etc. The expansion restrictive casing (11) protects bladder from damage due to excessive expansion, at the same time, it can ensure smooth entry and exit of oil fluid. The oil temperature controller (14) can provide the tank with a proper controlled temperature. (12) is the return pipe line from the pump, (13) is the supplying pipe line for the pump (17). If the system cannot meet the vacuum requirement, a two-way valve which can meet the vacuum requirement may additionally be set at (12) and (13). (16) is a cut-off valve for oil filling port. In case that the pump (17) needs to be supplied by force under pressure and pump shaft sealing cannot withstand the pressure of supplied oil at pump intake port (container pressure as referred herein), then, depending on the flow of leakage, a small variable flow pump (15) can be selected to discharge the leakage by force. Present apparatus requires a good sealing performance.

Volume changeable device is one of the important characteristics of present invention, requires a further description. Prior to filling oil into tank, the bladder should have a certain pressure, for example, approximately the same as atmospheric pressure. Then valves (10) and (9) are closed so that a certain amount of gas is retained in the bladder, oil fluid is filled through (16), at the same time gas is dispelled through (6) and (8), oil fluid is filled up to the top of container, that is, total space of tank except the bladder is filled with oil. Then (6) is closed, valves (8) and (9) are opened, vacuum pump (4) is started up, gas in bladder (2) is exhausted and its volume decreases, which causes oil level in the container to be down, a space of certain negative pressure or certain vacuum is formed at the top, said negative pressure must be adjusted to a proper value, so that gas, water content, volatile substances in the oil fluid can escape into this space, but hydraulic oil essentially does not volatilize. Next, valve (6) is opened to draw a vacuum from both bladder and the top space simultaneously. The pressure in bladder and in the top space should be properly adjusted and controlled so that vacuum forces exerted on bladder and top space are substantially balanced. Thus, there will not be a great variation of oil level, that is, the top space is still maintained while ensuring that hydraulic oil will not be drawn out by vacuum pump. After the pressure drops below the separating pressure for the air dissolved in oil fluid, it is maintained for a certain period of time so that all gas in oil fluid is exhausted completely. Then valves (6) and (9) are closed. At this time, the pressure in the container is very low. In order to ensure that pump may normally operate, it is necessary to open valve (10) so that gas is gradually refilled into bladder step by step, as a result, the bladder expands and pushes the oil fluid to the top of the tank and makes the fluid fill the whole tank so that the pressure in the sealed tank is restored. If a pump needs to be supplied by force, pump (3) can be started up to pressurize the bladder until the pressure in the sealed tank corresponds to the working pressure of the pump. Therefore, the volume changeable device plays double roles in decreasing volume to ensure vacuum and increasing volume to ensure working pressure of the pump. This static gas eliminating method not only can remove gas, water content and volatile substances from oil fluid, but also can ensure that the pressure of oil fluid corresponds to any working pressure at the intake port of a pump after all gas has been exhausted.

The vacuum range is normally between 700 mmHg and saturated vapour pressure of hydraulic fluid (approximately $10^{-3}$ to $10^{-4}$ mmHg under normal temperature), while the separating pressure of gas in hydraulic oil is normally about 50 mmHg, therefore, preferred vacuum pressure can be selected in the range of 50 mmHg to 0.1 mmHg. In order to ensure good effect of eliminating cavitation under optimal vacuum pressure, a method of slow gas filling can be applied whereby valve (10) is opened gradually. Valve (6) can be reopened to continuingly draw off traces of gas, water and volatile substances remaining in the top space of sealed container so that they will not be able to be dissolved in hydraulic oil once again when the pressure in the container is gradually restored. However, attention should be paid to oil level in order to timely close valve (6) before oil level reaches to top to avoid hydraulic fluid to be drawn into vacuum pump system.

The versatility and economic viability of the apparatus of present invention are further displayed in that said apparatus can be cut at oil supplying pipe line (13) and separated to form an independent movable pretreatment device for hydraulic fluid. However, it is necessary to make following changes in a general hydraulic system as well as in said apparatus:

1. A general hydraulic system must be sealed, and a bladder which can be refilled with gas should be put into the tank. Since the pressure in the tank varies with varying oil supply to the system (there will be a negative pressure in the sealed tank with excessive supply of oil to the system), the working pressure of pump under various oil supply to the system can be ensured, once a bladder and an air source are available.

2. A small oil supplying pump should be added to the oil supplying pipe line (13). The intake port of said pump should be connected to the tank of this apparatus, and a flow controlling valve should be installed at the outlet port of said pump. Said flow controlling valve should meet the vacuum requirement and should have a fitting to be connected with system.

3. Such device may be made as freely movable, may meet requirements of pretreatment of oil fluids used in various hydraulic systems as described above.

4. Such device may be further combined with various filters or other types of oil cleaning devices to form various kinds of combined pretreatment devices for cleaning and eliminating cavitation in hydraulic oil to meet the requirements of hydraulic systems under various conditions.

The operating method and process of this apparatus is as follows:

1. Oil filling process:

Close valves (9) and (10) under condition which the pressure in the bladder (2) is approximately equal to atmospheric pressure. Then open cut-off valve (16) at oil filling port, fill hydraulic fluid into tank, that is, the sealed container (1), to full extent; start up the main pump (17) and variable flow pump (15) simultaneously to fill hydraulic fluid into whole system (18) to full extent; stop pumps (15) and (17); fill tank (1) with fluid again to full extent as described above.

2. Process of removing gas, water content and volatile substances:

Close valves (10) and (16), open valves (6), (7), (8) and (9), start up vacuum pump (4), then open the valve (6) and vacuumize the flexible bladder and the top portion of the sealed tank simultaneously to obtain at vacuum pressure gauge (5) a vacuum reading between 50 mmHg and the saturated vapour pressure of hydraulic fluid (set according to requirements based on working medium), maintain the vacuum for a certain period of time, then close valves (8) and (9), stop vacuum pump (4), in case of relatively high viscosity of oil fluid, while drawing vacuum, give an appropriate heating using oil temperature controller (14) so that gas, water content and volatile substances may fast escape.

3. Volume changing process:

Open valve (10) to fill gas into bladder (2), let pressure in the tank be restored and increased until the pressure reading of pressure gauge (5) corresponds to the oil supplying pressure required by main pump (17). In case that only atmospheric pressure is required to supply oil fluid into intake port of pump (17), the pressure reading of pressure gauge (5) should be greater than atmospheric pressure by 0.2 to 0.1 times of atmospheric pressure to ensure that bladder (2) actuates sensitively and air is prevented from entering into system.

4. Process of oil replacement for the system with hydraulic fluid which has already been freed from gas, water content and volatile substances:

start up main pump (17) so that oil fluid in system (18) is replaced with oil fluid which has already been freed from gas, water content and volatile substances. Hydraulic fluid in system (18) returns to tank (1) through return pipe line (12). Repeat processes 2 through 4 as described above until said fluid in whole system meets the demand of no gas, no water content and no volatile substances. Then let the hydraulic fluid freed from gas, water and volatile substances run in the sealed system.

Present invention is able to eliminate cavitation in hydraulic oil in hydraulic systems, the amount of air remaining in hydraulic fluid may even be below 1 percent, and there is no foam in tank, thus cavity corrosion can be eliminated and the service life of whole hydraulic system and hydraulic fluid can be prolonged. The volumetric efficiency of pump as well as the limit of characteristic value CP can be improved (CP;N.D;N.QI/3 wherein N is rotating speed (RPM), D is characteristic measurement, Q is pump capacity (CM3/R), therefore, it is possible to break the speed and capacity limits of a pump, thus to provide a required condition for a pump to run at higher speed and larger capacity and to microminiaturized. It is also possible to further improve stiffness of cylinder and precision of movement, as well as stability and precision of valve control. Precision and reliability of movement of various actuators can be improved. Noise and vibration can be reduced so that a system can operate in a stable condition with better dynamic performance. Cavity blockade at flow controlling passages can be prevented, which makes possible to loose the design limitation to ratio of pressures at points ahead of and behind a flow controlling passage, thus to reach a higher speed. For example, creeping problem of precise mirror plane grinder remains unsolved up to now. Apart from variation in friction of slodeway, the main reason of its creeping lies in variation of stiffness of hydraulic oil as a result of cavitation occured in oil fluid inside cylinder. The noise and micro-vibration caused by cavitation make stability of grinder imperfect. Therefore, solution to cavitation problem further improves processing precision of precise grinder.

The tank of present invention may be used as a pressurized tank. Not only it is beneficial to oil supply to a pump, but also it may increase the speed and efficiency of the pump. In case that a pump needs to be supplied by force, the forcing oil supplying pump can be omitted, so that installation is simplified and cost is reduced. In addition, tank needs to be sealed to prevent oil fluid from being contaminated by outside environment.

The method and apparatus of present invention set forth no requirements which are difficult to meet other than the requirement of a good sealing in a system. Installation is simple, cost is low, operation in convenient, it is easy to implement.

It is not necessary to make many modifications for present invention to be implemented in a hydraulic system which can meet the sealing requirement. The only thing which needs to be done is to replace the original tank with this apparatus. Therefore, not only present invention is suitable to a new designed and manufactured hydraulic system, but also it can be used to improve a hydraulic system which has already been put into operation.

I claim:

1. A method for eliminating cavitation in hydraulic system, comprising the following operations:
   a. Filling a sealed tank with hydraulic fluid to full extent when a volume changeable device, which is connected to said sealed tank, is pressurized,
   b. Vacuumizing the volume changeable device so that the level of hydraulic fluid in said sealed tank descends, making space in the top portion of said tank to make the air, water content and volatile substances to separate from said hydraulic fluid and escape to the top portion of said sealed tank without volatilization of said hydraulic fluid,
   c. Vacuumizing said top portion of said sealed tank and volume changeable device simulaneously for exhausting said air, water content and volatile substances out of said tank, but not drawing out said hydraulic fluid, when the vacuum pressure in said sealed tank is substantially kept balanced,
   d. Gradually pressurizing said volume changeable device to make it expand until the desired operating pressure inside said sealed tank is reached, and
   e. Pumping said hydraulic fluid out of said sealed tank to supply said hydraulic system.

2. The method of eliminating cavitation according to the claim 1, wherein the pressure in said volume changeable device is approximately equal to the atmosphere when said sealed tank is filled with hydraulic fluid to full extent.

3. The method of eliminating cavitation according to claim 1, wherein the degree of vacuum is between 700 mmHg and saturated vapor pressure of hydraulic fluid when said volume changeable device and the top portion of said sealed tank are vacuumized simultaneously.

4. The method of eliminating cavitation according to claim 3, wherein the degree of vacuum is between 50 mmHg and 0.1 mmHg when said volume changeable device and the top portion of said sealed tank are vacuumized simultaneously.

5. The method of eliminating cavitation according to claim 1, wherein the remains of air, water content and volatile substances in said top portion of said sealed tank can be moderately and continually drawn out at the same time, when said volume changeable device is pressurized to make the pressure inside said sealed tank to achieve the operating pressure.

6. The method of eliminating cavitation according to claim 1, wherein the vacuum pressures in both of the interior and exterior of the volume changeable device are balanced so that no expansion occurs when said volume changeable device and the top portion of the sealed tank are vacuumized simultaneously.

7. An apparatus for eliminating cavitation in the hydraulic system, comprising:
   a sealed tank with crown-shaped upper-inner wall,
   means for introducing hydraulic fluid into said sealed tank,
   means for removing said fluid from said sealed tank,
   a degassing device connected to the top of said sealed tank and composed of controlling pipelines, vacuum cut-off valves, vacuum pumps and measuring instruments to generate vacuum for exhausting the air, water content and volatile substances out of said hydraulic fluid, and
   a volume changeable device connected with said tank, said volume changeable device composed of a sealed flexible bladder which is connected to a pressurized air source through a controlling vacuum valve and is connected to the degassing device through said controlling pipelines for regulating and controlling the vacuum and the pressure and quantity of fluid in said sealed tank by changing the volume of said bladder.

8. The apparatus for eliminating cavitation according to claim 7, wherein said bladder of said volume changeable device is installed inside said sealed tank at the lower portion and said bladder is covered by an expansion restrictive casing.

9. The apparatus for eliminating cavitation according to the claim 7, wherein the upper-inner wall of said sealed tank is half-spherical shaped.

10. An apparatus for eliminating cavitation in the hydraulic system according to claim 7, wherein the sealed flexible bladder is fixed inside the sealed tank, and is connected to an end of a three-way connector through a pipe in the exterior of said sealed tank, the second end of the three-way connector is connected to a pressurized air source, the third end of the three-way connector is connected to a four-way connector of the degassing device through the controlling pipelines and valves.

11. An apparatus for eliminating cavitation in the hydraulic system according to claim 7, wherein the degassing device comprises a four-way connector, wherein the first end of the four-way connector is connected to the sealed flexible bladder through valves, the second end thereof is connected to the topmost portion of said sealed tank, the third end thereof is connected to a vacuum pump through a valve, and the fourth end thereof is connected to vacuum pressure instruments through valves.

12. An apparatus for eliminating cavitation in the hydraulic system according to claim 7, wherein the means for introducing hydraulic fluid into the sealed tank is connected to a hydraulic system and the means for removing the fluid therefrom is connected to the hydraulic system through a pump for forming a hydraulic system in a closed loop manner.

* * * * *